UNITED STATES PATENT OFFICE.

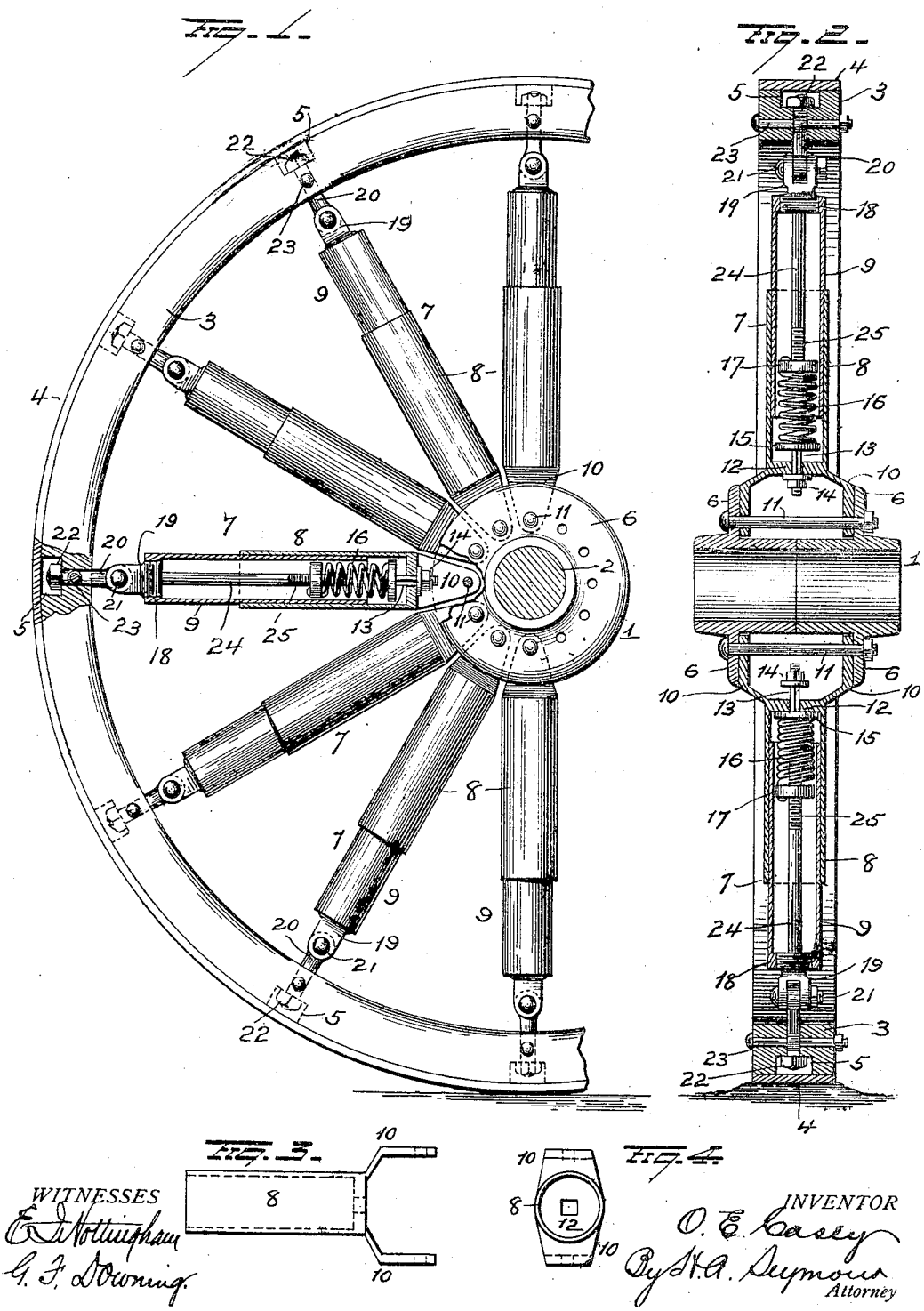

OWEN E. CASEY, OF NASHUA, MINNESOTA.

RESILIENT WHEEL.

1,067,504.  Specification of Letters Patent.  Patented July 15, 1913.

Application filed December 12, 1912. Serial No. 736,316.

*To all whom it may concern:*

Be it known that I, OWEN E. CASEY, of Nashua, in the county of Wilkin and State of Minnesota, have invented certain new and useful Improvements in Resilient Wheels; and I do hereby declare the following to be a full, clear, and exact description of the invention, such as will enable others skilled in the art to which it appertains to make and use the same.

This invention relates to improvements in resilient wheels and more particularly to that type in which the resilience is effected by the construction of the spokes, the object of the invention being to provide a simple and efficient construction in which the springs of the spokes shall be normally under tension, and in which the parts of the spokes which house said springs shall have pivotal connection, respectively, with the hub and the felly.

A further object is to so construct the wheel that shocks will be effectually absorbed and the smooth and easy running of the vehicle insured.

With these and other objects in view, the invention consists in certain novel features of construction and combinations of parts as hereinafter set forth and pointed out in the claims.

In the accompanying drawings, Figure 1 is a side elevation, partly in section, showing a portion of a wheel embodying my improvements; Fig. 2 is a sectional view, and Figs. 3 and 4 are detail views showing one of the tubular members of a spoke.

1 represents a hub to receive an axle 2, and 3 indicates the felly of the wheel on which a tire 4 may be located, said felly being provided with a plurality of recesses 5 and the hub being provided with spaced annular flanges 6, for the accommodation of attaching means for spokes 7, as will be more fully hereinafter explained. Each spoke comprises two telescoping tubes 8—9,—the tube 8 being open at its outer end to receive the tube 9 and the latter being open at its inner end to accommodate a spring as presently explained. The tube 8 is provided at its inner end with flaring arms 10, the inner ends of which are disposed against the inner faces of the parallel flanges 6 on the hub and pivotally connected with said flanges by means of a bolt 11. Near its inner end, the tube 8 is provided with a diaphragm 12 having a central angular hole through which a short rod 13 (angular in cross section throughout a portion of its length) passes, the inner portion of said rod being threaded for the accommodation of a nut 14. The upper end of the short rod 13 is provided with a head 15, to which the inner end of a spring 16 is secured. The inner portion of this spring is located within the tube 8 and said spring is of sufficient length to extend into the tube 9, wherein its outer end is secured to a disk 17 having a central threaded hole. The outer end 18 of the tube 9 is provided with a threaded hole to receive the threaded portion of a head 19, the latter being bifurcated to receive one end of a short rod 20 which is pivotally connected with said head by means of a bolt or pin 21. Each short rod 20, is provided at its outer end with a head 22 seated in one of the recesses 5 in the felly and longitudinal displacement of each rod 20 is prevented by a cross pin or bolt 23 which passes transversely through said rod and the felly. A rod 24 is made rigid with the head 19 so as to be disposed centrally within the tube 9 and is made with a threaded portion 25 to pass through the threaded opening in the disk 17 to which latter, the outer end of the spring 16 is secured.

In assembling the wheel, the operator will turn the rod 24 of each spoke and thus cause the disk 17 to move outwardly within the tube 9 and stretch or put the spring 16 under contractile tension and then secure said rod to the felly in the manner above described. The springs in the various spokes should be subjected, in this manner, to the same degree of tension, so that the normal condition of the springs (when not subjected to strain or pressure) will be as illustrated in Fig. 1 and in the upper portion of Fig. 2.

When the wheel is in use, the weight of the vehicle will permit the springs to approach their closed position and the short rods to slide freely through the diaphragms 12 when the spokes become disposed under the axle, and the weight will therefore be suspended largely from the springs of the spokes which are above the plane of the axle, and the major portions of the jars to which the wheel may be subjected will be absorbed by these springs.

Various slight changes might be made in the details of construction of my invention without departing from the spirit thereof or limiting its scope and hence I do not wish to restrict myself to the precise details herein set forth, but Having fully described my invention what I claim as new and desire to secure by Letters-Patent, is:—

1. In a wheel, the combination with a hub and a felly, of a plurality of spokes, each comprising telescoping tubes, means pivotally connecting one of said tubes with the hub, a head secured to the outer end of the other tube, a rod secured to the felly and pivotally connected with said head, a rod secured to the head on one of the tubes and having a threaded rod disposed within said tube, a disk adjustable on said threaded rod, a spring within said tubes and having one end secured to said disk, a short rod connected with the other end of said spring and passing through the inner end wall of the tube connected with the hub, and means for adjusting said short rod and holding it at any desired adjustment.

2. In a wheel, the combination with a hub and a felly, the latter having recesses, of a plurality of spokes, each comprising telescoping tubes, each closed at one end, means connecting one of said tubes with the hub, springs within said tubes, a short rod passing through one end of one of said tubes and secured to one end of said spring, a rod secured within the other tube and adjustably connected with the other end of said spring, a short rod passing through the felly and having a head seated in one of the recesses in the felly, means connecting said rod with the outer tube of the spoke, and a bolt passing transversely through the felly and said last-mentioned short rod.

In testimony whereof, I have signed this specification in the presence of two subscribing witnesses.

OWEN E. CASEY.

Witnesses:
A. J. PITHEY,
WM. J. MCALPEN.

---

Copies of this patent may be obtained for five cents each, by addressing the "Commissioner of Patents, Washington, D. C."